United States Patent [19]
Crompton, Jr.

[11] 4,433,865
[45] Feb. 28, 1984

[54] VEHICLE SWAY DAMPER

[76] Inventor: Edward E. Crompton, Jr., 906 W. Arlington Rd., Erie, Pa. 16509

[21] Appl. No.: 368,146

[22] Filed: Apr. 14, 1982

[51] Int. Cl.³ .............................................. B62D 35/00
[52] U.S. Cl. ...................................... 296/1 S; 296/91
[58] Field of Search ................................... 296/1 S, 91

[56] References Cited

U.S. PATENT DOCUMENTS

| | | | |
|---|---|---|---|
| 2,976,077 | 3/1961 | Totton | 296/1 S |
| 3,010,754 | 11/1961 | Shumaker | 296/1 S |
| 3,063,748 | 11/1962 | Keeler | 296/91 |
| 3,960,402 | 6/1976 | Keck | 296/1 S |
| 4,214,787 | 7/1980 | Chain | 296/1 S |

*Primary Examiner*—Robert R. Song
*Attorney, Agent, or Firm*—Charles L. Lovercheck; Wayne L. Lovercheck; Dale R. Lovercheck

[57] ABSTRACT

A vehicle having a body with sides presenting a substantially large lateral projection adapted to be engaged by unbalanced air currents when passing substantially large vehicles traveling at relatively high speeds on the highway is disclosed. A flap system is attached to the rear end of the body of the vehicle and adapted to be moved by air currents on the first side of the vehicle body to a position on a second side of the vehicle body for putting a drag on the second side thereby preventing side sway of the vehicle.

11 Claims, 7 Drawing Figures

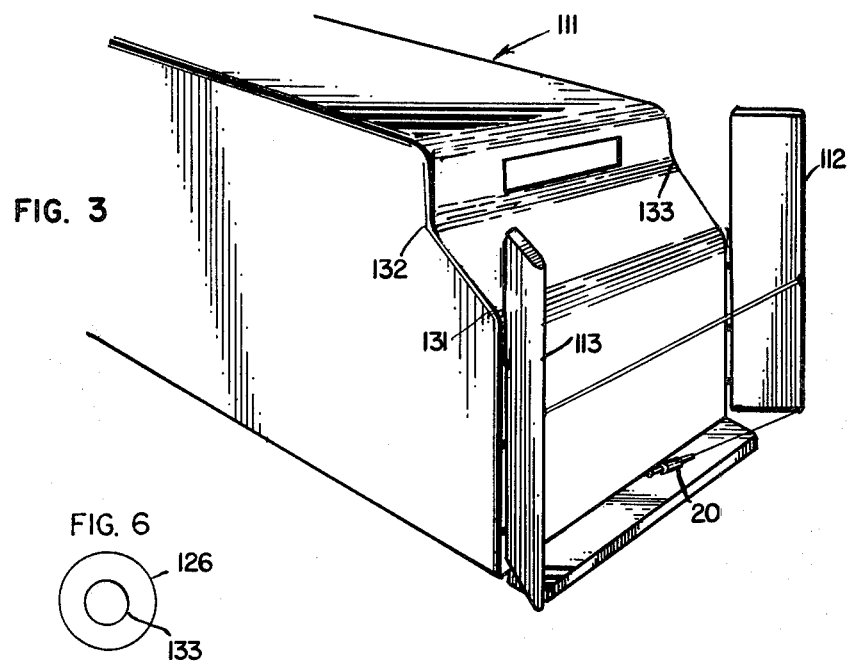
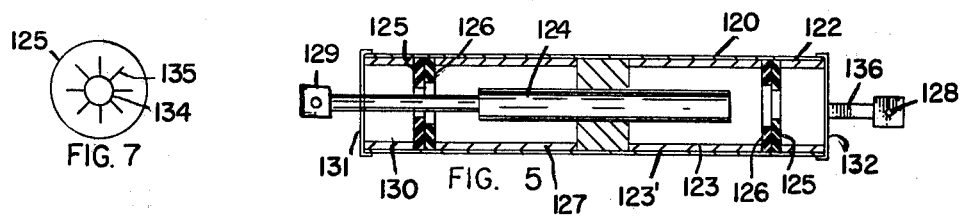
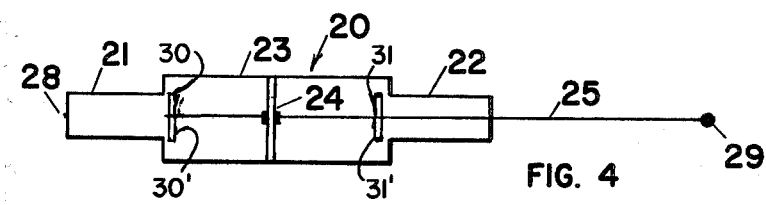

VEHICLE SWAY DAMPER

GENERAL STATEMENT OF INVENTION

Vehicles with bodies such as house trailers, travel trailers, and trucks that present a large lateral projection sustain large unbalanced lateral air pressure when passing large speeding vehicles on highways. These unbalanced pressures cause the vehicle to experience side sway which may become serious and even disastrous.

REFERENCE TO PRIOR ART

Applicant knows of no relevant prior art. The problem of trailer sway has been recognized and various electrical devices have been proposed for attaching to the trailer hitch to damp out trailer sway. U.S. Pat. No. 2,976,071 shows flaps that are attached to the sides of the vehicle for a different purpose than Applicant's invention.

REFERENCE TO RELATED PENDING APPLICATION

Applicant has no related prior pending application.

OBJECTS OF THE INVENTION

It is an object of the invention to provide a system for a vehicle to prevent sway when passing other vehicles.

Another object of the invention is to provide a vehicle anti-sway device that is simple in construction, economical to manufacture and simple and efficient to use.

Another object of the invention is to provide a sway prevention apparatus for a vehicle which is made up of flaps attached to the rear corners of the vehicle and connected together by a link so that when an air current strikes a first side of the vehicle, the flap on the first side is pushed toward the second side thereby forcing a second flap outward on the second side of the vehicle which will place a drag on the vehicle body thereby damping out the sway of the vehicle body.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

GENERAL DESCRIPTION OF DRAWINGS

FIG. 3 is an enlarged cross-sectional view of the damping cylinder shown in FIGS. 1 and 2.

FIG. 4 is a schematic view of the damping cylinder of the invention.

FIG. 5 is a schematic view of another embodiment of the damping cylinder.

FIG. 6 is an enlarged view of a part of FIG. 5.

FIG. 7 is an enlarged view of another part of FIG. 5.

DETAILED DESCRIPTION OF DRAWING

Figure 1:
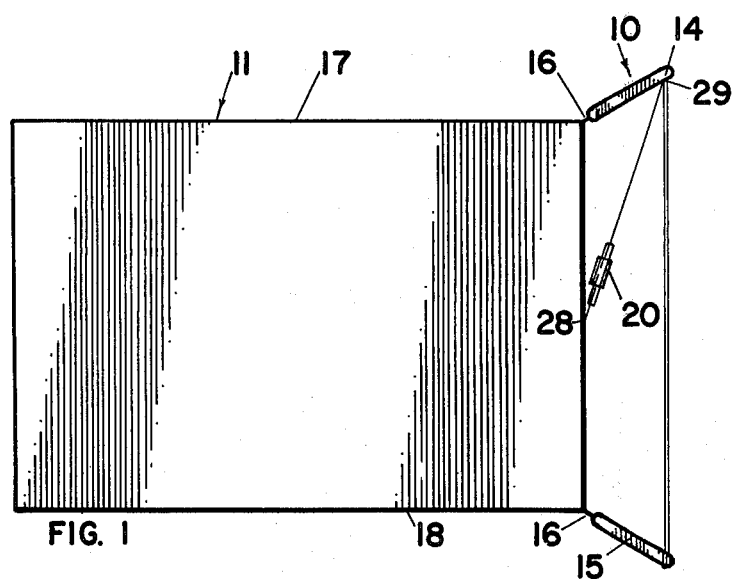
FIG. 1 is an isometric view of the rear part of a vehicle according to the invention.

Now with more particular reference to the drawings. Vehicle 10 as shown may be the rear end of a house trailer, travel trailer, semi-trailer or truck of the type commonly seen on highways. The body 11 presents a substantially large side projection of side 17 and 18 so that when the vehicle passes another vehicle on the highway, that is traveling at a substantially high speed, the air currents from the passing vehicle surge against one of the sides 17 or 18 which forces the body 11 laterally. The present invention provides flaps 12 and 13 hinged to the trailer body 11 at 16 and a vehicle passing on side 18 causes air currents to engage the flap 13 pushing it toward the flap 12 and flap 12 is forced out into the slip stream along side 17 thereby exerting a compensating force which will hold the vehicle body in a straight line of travel.

The flap system attached to the vehicle 10 and made up of a plurality of plate-like flap members 12 and 13 each having a first edge 14 and a second edge 15. The hinge means 16 which may be attached directly to the second edge 15 of the flap and directly to the body 11 of the vehicle. The flaps 12 and 13 are adapted to swingably connect to the side 17 and 18. A link 19 is pivotally attached at 26 and 27. The damping means 20 which is in the form of a cylinder is attached to the body and it has piston rod 25 that is pivotally attached to the flap 14 at 29.

The cylinder 20 has two reduced diameter ends 21 and 22 and an intermediate large diameter part 23. The pistons 30 and 31 are attached to the rod 25 at spaced positions. The pistons move freely in the enlarged part 23 of the cylinder 20 and either piston 30 or 31 will exert a resistance on the piston rod 25 when the vehicle 11 passes another vehicle on either side. In such event, the flaps 12 and 13 are forced toward the direction away from the passing vehicle and when the pistons are moved into the reduced size areas of the cylinder and air pressure from the slip stream is exerted on the flap on the side opposite the passing vehicle, the piston will be urged to move out of the reduced size and a frictional force will be exerted on the interior of the reduced size portions of the cylinder by the pistons which are slightly larger than the bores in the reduced size area, and the pistons will freely slide in since their outer periphery will fold back on itself but will exert a frictional force when the force on the piston rod is reversed tending to move the pistons out of the reduced size portion thereby holding the flap in position to control the vehicle in a straight line.

In normal operation, the flaps 12 and 13 are held at a position about 45° to the sides 17 and 18 of the vehicle body and a slip stream on each side of the vehicle body balances the pressure on the two flaps through the link 19 holding them in equal angular position. Then when a vehicle passes on side 18, for example, the air currents from the vehicle will engage the flap 13 forcing it toward the side 17. This will force the flap 12 outward and it will thereby form a greater resistance to the slip stream on side 17 of the trailer thereby holding the trailer straight and balancing the forces on the sides 17 and 18.

The piston 24 will enter the reduced size end 22 thereby preventing a hunting action and reducing the rate of movement of the flap during the end parts of its excursion about hinges 16.

In the embodiment of the invention shown in FIG. 3 the flaps 112 and 113 on vehicle body 111 extend up being the contour of the trailer at 132 and 133. The operation of the flaps 112 and 113 on the vehicle 111 is identical to the operation of the flaps on the vehicle shown in FIGS. 1 through 3.

Figure 2:
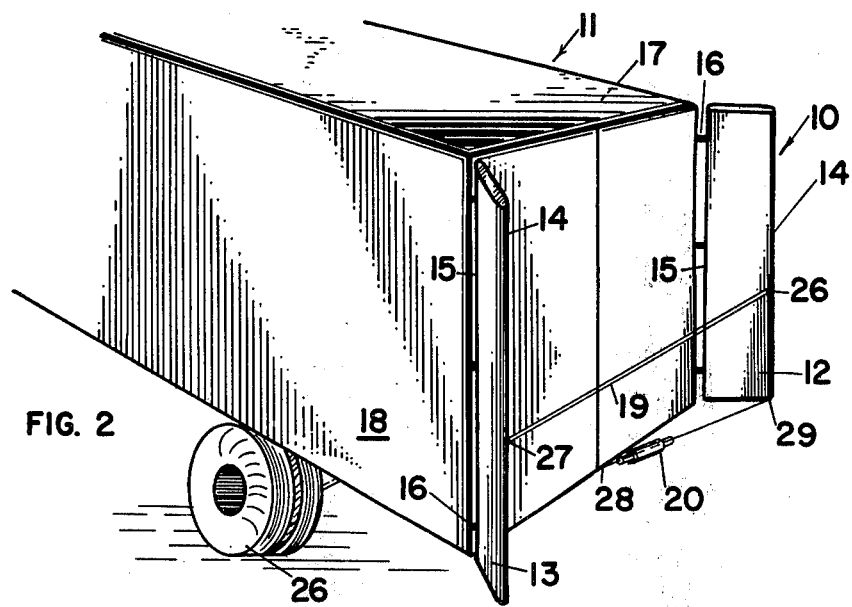
FIG. 2 is a top view of the vehicle shown in FIG. 1.

The embodiment of the invention shown in FIG. 5 the damping means 120 is intended to use in place of the device 20 shown in FIG. 2 and device 120 shown in FIG. 3. The device 120 has an outside cylinder 123' which supports the spacers 122, 123, 127 and 130 and has end caps 131 and 132. Bracket 128 may be attached to the trailer. The piston rod has a bracket 129 on it for attaching to one of the flaps.

The washers 126 has a large hole 133 in it through which the piston 124 slides and the washer 125 has a small hole 134 in it which has radial slots 135 cut in it. Thus when the piston 124 for example moves toward the right it enters opening 133 and the part of the washer 125 adjacent the central hole 134 is deflected outward so that the piston moves freely toward the end. Then as the piston moves backward, the end of the parts around hole 134 are pushed back against the washer 126 and into the large opening 133 and apply a frictional force to the piston thereby causing it to move slowly toward the neutral position. The piston operates in the same manner as it moves to the left.

The foregoing specification set forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed or defined as follows:

1. A flap system for a vehicle comprising,
a plurality of elongated plate-like flap members each having a first edge and a second edge,
hinge means attached to said first edge of each said flap and adapted to swingably connect said flaps to a first side and a second side respectively of a vehicle,
link means pivotally attached to said second edge of one said first flap and a second edge of said second flap,
said link means being connected to said flaps and adapted to hold said first edges of said flaps in spaced relation to each other,
means connected to at least one said flap at its second edge adapted to allow each said flap to swing freely in a first direction,
and to restrain the swinging movement of each said flap in a second direction.

2. The flap system recited in claim 1 wherein said flaps are normally disposed in two planes generally parallel to each other.

3. The flap system recited in claim 2 wherein said means connected to said first edges of said flaps comprises a fluid controlled means.

4. The flap system recited in claim 3 wherein said fluid controlled means comprises a hollow cylinder,
said hollow cylinder having a first end section and a second end section,
an intermediate part,
said first end section and said second end section being of substantially smaller diameter than said intermediate part and integrally connected to said intermediate part,
and a piston in said cylinder,
a piston rod attached to said piston,
said piston rod being connected to a second edge of one of said flaps.

5. The piston recited in claim 4 wherein said cylinder has means thereon to attach it to a vehicle body.

6. In combination, a vehicle having a body and at least two wheels supporting said body,
said vehicle having parallel sides that present relatively large generally parallel vertical areas,
said flap system comprising a plurality of elongated plate-like flap members each having a first edge and a second edge,
hinge means attached to said first edge of each said flap and attached to a side of said vehicle and adapted to swingably connect said flaps to said side of said vehicle on a first side and a second side of said vehicle respectively,
link means pivotally attached to said second edge of one said first flap and to said second edge of said second said flap,
said link means being connected to said flaps and adapted to hold said first edges of said flaps in spaced relation to each other,
means connected to at least one of said flap at its second edge adapted to allow each said flap to swing freely in a first direction,
and to restrain the swinging movement of each said flap in a second direction.

7. The flap system recited in claim 6 wherein said flaps are normally disposed in two planes generally parallel to each other.

8. The flap system recited in claim 7 wherein said means 20 connected to said second edges 14 of said flaps comprises a fluid controlled means.

9. The flap system recited in claim 8 wherein said fluid controlled cylinder 20 comprises a generally hollow cylindrical body,
said body having a first end 21 section and a second end section 22, and an intermediate part 23,
said first end section and said second end section being of substantially smaller diameter than said intermediate section,
and a piston 24 in said cylinder,
a piston rod 25 in said cylinder,
said piston rod 25 being connected to said first edge of one said flap.

10. The flap system recited in claim 9 wherein said cylinder is adapted to be fixed to said vehicle body.

11. In combination a vehicle 11 having a body and at least two wheels 26 supporting said body,
a flap system 10 comprising a plurality of elongated plate like flap members each having a first edge and a second edge,
hinge means attached to said first edge of each said flap and adapted to swingably connect said flaps to a first side and a second side respectively of a vehicle,
link means pivotally attached to said second edge of one said first flap and to a said second edge of said second flap,
said link means being connected to said flaps and adapted to hold said first edges of said flaps in spaced relation to each other,
and means connected to at least one said flap at its second edge adapted to allow each said flap to swing freely in a first direction,
and to restrain the swinging movement of each said flap in a second direction.

* * * * *